Dec. 30, 1930.  L. A. KAUFFMAN ET AL  1,786,716
HYDRAULIC VALVE GEAR
Filed Jan. 18, 1929
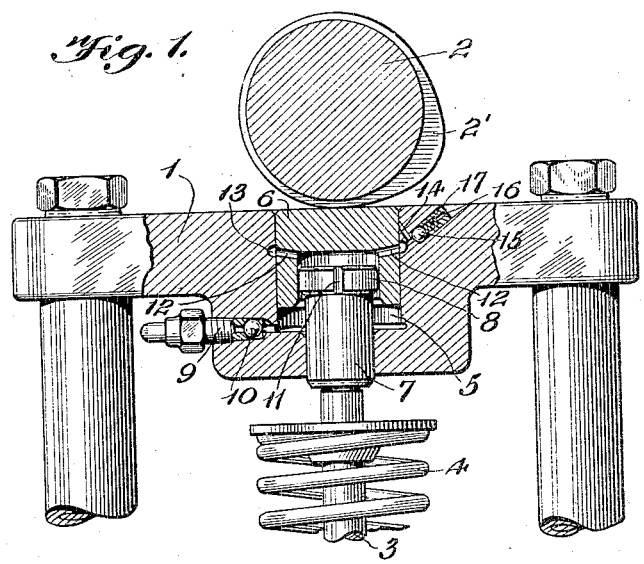
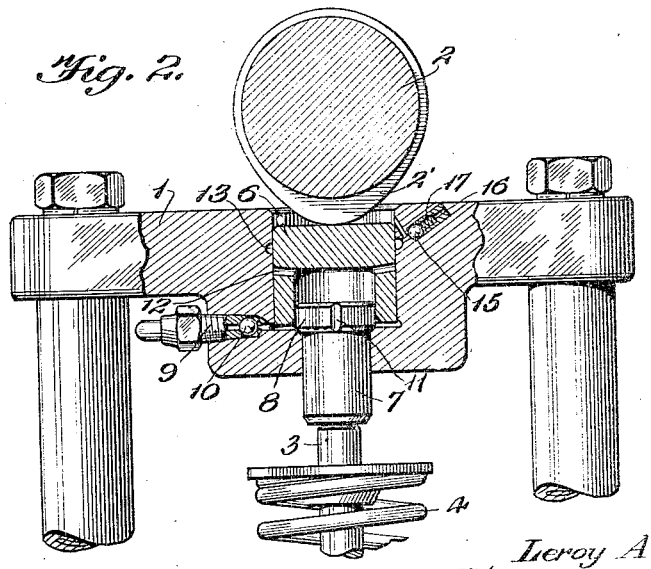
Inventor
Leroy A. Kauffman,
and Windsor Davis.
By Stanley Lightfoot.
Attorney Patented Dec. 30, 1930

1,786,716

UNITED STATES PATENT OFFICE

LEROY A. KAUFFMAN AND WINDSOR DAVIS, OF WASHINGTON, DISTRICT OF COLUMBIA, ASSIGNORS TO WARREN NOBLE, OF DETROIT, MICHIGAN

HYDRAULIC VALVE GEAR

Application filed January 18, 1929. Serial No. 333,455.

This invention relates to hydraulic valve gears and has for its object to provide an efficient gear composed of fewer parts than any similar gear heretofore proposed or built and which will be cheaper to manufacture, more reliable in operation and freer than usual from small and intricate parts which usually render the proper assembly of such mechanisms beyond the skill of the poorer mechanics.

It is the specific object of this invention to provide an improved air bleeding mechanism for normal operation which is free from pressure sensitive valves of the diaphram or check valve type or any other similar design requiring individual bleed structures and yet which will function to efficiently collect and bleed air.

It is a further object of the invention to provide an air bleed which will not bleed fluid from the system unless air is present, thereby reducing the loading necessary on the supply mechanism and also materially reducing the likelihood of lost motion.

It is a still further object of the invention to provide an auxiliary bleed mechanism which may be considered an integral part of the above described bleeding arrangement which will function to bleed air upon initial charging of the system with fluid and which will automatically become inoperative for further bleeding as quickly as the system becomes filled with oil, the first described bleeding mechanism then taking care of all air thereafter.

In carrying the invention into effect we may provide a reservoir for collecting air which is located outside of the hydraulic chamber. This reservoir communicates with the hydraulic chamber from the highest point thereof during periods of puppet valve inactivity and is closed by a slide valve which may be comprised of one of the plungers conventionally employed as an open side of the reservoir. As quickly as an impulse is imposed on the actuator plunger a certain amount of liquid and any air present will be driven into the little reservoir, the slide will close and in view of the fact that pressure will have begun to rise in the hydraulic chamber immediately upon movement of the actuator plunger, this pressure will be transmitted to the oil and air in the reservoir. If air is present, then, it will compress. The plunger on further actuation may open an outlet from the reservoir releasing the pressure and thereby allowing the air to vent.

For starting purposes wherein a greater amount of air must be bled than can be quickly accommodated by the above described collecting means we propose to take advantage of certain facts well known to those skilled in the art of handling fluids under pressure as in the use of bearings. It is well known that lubricant or fluid cannot be faced between two substantially contacting static surfaces. Thus in the case of bearings no lubrication can be effected between the contacting surfaces until rotation of one surface occurs whereupon oil is dragged along and a film is provided between the surfaces. It is further known that air cannot be driven through a film of oil under pressure. Thus there is no air in bearings although air bubbles may have existed in the oil prior to feeding to the bearings. It is also, of course, well known that air can be forced through an extremely small opening. We propose to take advantage of the above facts by providing a vent at some point in our valve gear, preferably from the exact region of air accumulation or from the reservoir above described, the vent to carry a ball which will have a very restricted limit of activity whereby it will almost contact its seat when open and which upon becoming wet will immediately seal itself due to the fact that an oil film will form between the ball and seat past which air cannot pass. By this arrangement air may be bled freely until the system is filled with lubricant whereupon the valve will automatically become inoperative, the system then depending for bleeding on the arrangement previously described.

A complete understanding of the invention will be had with reference to the accompanying drawings wherein is illustrated, by way of example and not in a limiting sense, one embodiment of our invention as it may be carried into effect with an engine employing an overhead camshaft and wherein:

Figure 1 is a side view, partly broken away, of our improved hydraulic valve gear in normal position, and Figure 2 is a view similar to Figure 1 showing the valve gear in operative position or position of maximum actuation.

Referring more particularly to the drawings, numeral 1 designates the tappet guide or casing generally employed with an overhead camshaft 2 except for such modifications as are necessary for conversion into a hydraulic valve mechanism as will hereinafter become apparent, and 3 refers to a puppet valve provided with the usual return spring 4.

The casing 1 is bored at 5 to receive a hollow plunger 6 which is of less length than the depth of the hole 5. Extending through the casing 1 is a second plunger 7 which may be the valve stem or an extension thereof and which is provided with a smooth upper end 8 for snugly fitting within plunger 6.

A fluid pressure supply line 9 which may be connected into the engine lubricating system is led into the casing 1 and preferably inlets into bore 5 at or near the bottom thereof. A non-return check valve 10 prevents backflow into the line 9. As fluid enters the bore 5 from line 9 it fills the space in the bottom thereof and passes through a groove 11 into the space between the plungers 6 and 8 which is hereinafter referred to as the hydraulic chamber. Any air in the system will seek the highest point thereof which, in the example shown, is the top of plunger 6. Leading from this region of air accumulation are passageways 12 which, when the plunger 6 is in normal position as shown in Figure 1, are in communication with a reservoir 13 herein shown as comprising an annular groove in the side of casing 1. Air collecting in the hydraulic chamber will be conducted on account of its buoyancy to the reservoir 13 and as quickly as actuator 6 receives impulse from cam 2' such air as may be collected in the reservoir will immediately be placed under pressure equal to the pressure in the hydraulic chamber. Very soon after beginning its downward motion it is readily seen that the passages 12 are disconnected from communication with the reservoir 13 and the air under pressure remains in the reservoir until an outlet passageway 14 which is in continuous communication with the reservoir, is uncovered by the plunger 6. It is best that the outlet of passageway 14 be uncovered immediately after the closing of the communication between the hydraulic chamber and the reservoir has been effected as the pressure in the reservoir will not have had sufficient time to become dissipated. As quickly as the outlet 14 is uncovered the air in the reservoir, being under compression, will quickly escape.

It is to be noted that if no air is present, any oil which may be present in the reservoir is substantially incompressible so that no bleeding would occur upon uncovering of the outlet passage 14 so that no loss of fluid would occur.

It is seen that such an arrangement will effectively remove air in small quantities as it collects, however, when it is desired to initially fill the system such a device alone would not in itself function to quickly relieve a long column of air in the conventional overhead type of valve gear.

We, therefore, provide a valve which will function to vent air but which will become inoperative for further bleeding of oil or air as quickly as it shall have served its purpose. Such an arrangement is shown in the drawings wherein a check valve 15 guards an outlet passageway 16 in communication with the reservoir 13. The ball 15 is provided with a slight bit of play between its open or downward position and its seated position. The amount of travel allowed the ball should preferably be about one and a half or two and a half thousandths of an inch. The operation is as follows: upon initially charging the system with oil air will escape past the check valve until oil reaches the ball whereupon the ball and its seat will become wet, a film of oil forming between them. This film forms an effective seal against further escape of oil or air as previously explained. As long as oil is present then the check valve will no longer function as a valve but will act as a seal for outlet 16. As quickly as this valve shall become inoperative the outlet 14 then stands ready to assume its normal duty as described. A spring 17 may be provided to hold ball 15 from its seat as it does not need to seat to form a seal and this spring assures the ball being unseated at any time lubricant is withdrawn or recedes from the system.

It will be obvious that numerous modifications and embodiments may be made and such changes may be made as to adapt it to various types of engines without departing from the spirit or scope of my invention and we therefore desire to be limited in the application and construction thereof only by the scope of the appended claims wherein we claim:

1. In a hydraulic valve operating mechanism, an operating and an operated plunger, a hydraulic fluid chamber intermittently connected to a source of fluid supply, means outside of said chamber for collecting air accumulating therein, means for compressing air collected and means for releasing the pressure whereby said air is vented.

2. In a hydraulic valve operating mechanism, an operating and an operated plunger, a hydraulic chamber between said plungers having a region of air accumulation therein, a source of fluid pressure supply for replenishing fluid in said chamber, an air collection reservoir outside of said chamber adapted for connection with said region of air accumulation whereby air in said system will freely pass into said reservoir, the fluid in said chamber acting to compress the air in said reservoir upon a rise in pressure thereon, means comprising a valve for disrupting communication between said reservoir and said hydraulic chamber after said air is compressed and means for releasing the pressure on said air whereby said air is vented from said reservoir.

3. In a hydraulic valve operating mechanism, an operating and an operated plunger, a hydraulic chamber between said plungers having a region of air accumulation therein, a source of fluid pressure supply for replenishing fluid in said chamber, an air collection reservoir outside of said chamber adapted for connection with said region of air accumulation whereby air in said system will freely pass into said reservoir during periods of puppet valve inactivity, actuation of said operating plunger to a small extent creating a rise in pressure in said system whereby air in said reservoir is compressed, actuation of said plunger to a greater extent closing communication between said region and said reservoir whereby air is trapped in said reservoir under pressure, actuation of said plunger to a still greater extent uncovering a passageway to said reservoir to the atmosphere whereby said air is vented during periods of puppet valve actuation.

4. In a hydraulic valve operating mechanism, an operating and an operated plunger, a hydraulic fluid chamber between said plungers, means for venting air upon initially charging said system with fluid, said means becoming inoperative upon said system becoming filled with fluid, and means for bleeding air from said system during normal operation.

5. In a hydraulic valve operating mechanism, an operating and an operated plunger, a hydraulic fluid chamber having a region of air accumulation therein between said plungers, means for venting air from said system from said region of air accumulation during periods of charging said chamber with fluid, said means becoming inoperative for further bleeding upon becoming wet with said fluid, and means for bleeding air from said chamber during normal operation of said mechanism, said last named means being inoperative to bleed fluid.

6. In a hydraulic valve operating mechanism, an operating and an operated plunger, a hydraulic fluid chamber having a region of air accumulation therein between said plungers, means for venting air from said system from said region of air accumulation during periods of charging said chamber with fluid, said means becoming inoperative for further bleeding upon becoming wet with said fluid, and means for bleeding air from said chamber during normal operation of said mechanism, said means operating to bleed air from said mechanism during periods of puppet valve activity.

Hereunto affixed our signatures.
LEROY A. KAUFFMAN.
WINDSOR DAVIS.